United States Patent
Dowty

(10) Patent No.: US 11,827,362 B2
(45) Date of Patent: Nov. 28, 2023

(54) DEVICE TO RESOLVE ANGLED OTTOMAN CONFIGURATION

(71) Applicant: B/E Aerospace, Inc., Winston-Salem, NC (US)

(72) Inventor: Mark B. Dowty, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 601 days.

(21) Appl. No.: 16/996,737

(22) Filed: Aug. 18, 2020

(65) Prior Publication Data

US 2022/0055754 A1  Feb. 24, 2022

(51) Int. Cl.
*B64D 11/06* (2006.01)

(52) U.S. Cl.
CPC ...... *B64D 11/0643* (2014.12); *B64D 11/0601* (2014.12); *B64D 11/064* (2014.12); *B64D 11/0602* (2014.12)

(58) Field of Classification Search
CPC ............ B64D 11/0643; B64D 11/0601; B64D 11/064; B64D 11/0602; B64D 11/0646; B60N 3/063; B60N 2/34; B60N 3/06
USPC ...................................... 297/423.26, 84, 118
See application file for complete search history.

(56) References Cited

U.S. PATENT DOCUMENTS

| | | | | |
|---|---|---|---|---|
| 2,431,661 A | * | 11/1947 | Ragsdale | B61D 31/00 297/423.26 |
| 2,857,955 A | * | 10/1958 | De Vries | A47C 1/0355 297/84 |
| 5,950,263 A | * | 9/1999 | Hanson | A61G 5/1045 297/452.21 |
| 6,305,644 B1 | | 10/2001 | Beroth | |
| 6,588,837 B1 | * | 7/2003 | Schultz | A47C 17/165 297/118 |
| 7,399,031 B2 | * | 7/2008 | Gardner | B60P 3/36 297/118 |
| 7,455,342 B2 | * | 11/2008 | Lechkun | B60N 2/995 296/64 |
| 7,721,991 B2 | | 5/2010 | Johnson | |
| 7,988,235 B2 | * | 8/2011 | Clough | B64D 11/0643 297/423.35 |
| 7,997,531 B2 | | 8/2011 | Bettell | |
| D737,089 S | | 8/2015 | Taylor | |
| 10,070,725 B2 | * | 9/2018 | Nelson | A47C 4/028 |

(Continued)

FOREIGN PATENT DOCUMENTS

DE  102006053031 A1  6/2008
EP  0557458 A1  9/1993
(Continued)

OTHER PUBLICATIONS

Extended Search Report for European Application No. 21191479.1 dated Jan. 18, 2022, 8 pages.

*Primary Examiner* — Richard Green
*Assistant Examiner* — Madison Elizabeth Dittner
(74) *Attorney, Agent, or Firm* — Suiter Swantz pc llo

(57) ABSTRACT

A deployable ottoman extension fills the gap between the ottoman and fully reclined oblique aircraft seat. The deployable ottoman extension can pivot out from the ottoman about a pivot point and/or slide out along a rail. Alternatively, the ottoman extension may be hinged to the ottoman to deploy by flipping down. The deployable ottoman extension may include deployable support features that extend to the aircraft floor when deployed.

8 Claims, 9 Drawing Sheets

(56) References Cited

U.S. PATENT DOCUMENTS

| | | |
|---|---|---|
| 10,501,188 B2 | 12/2019 | Nicholas et al. |
| 2010/0132118 A1* | 6/2010 | Robertson .............. A47C 17/16 5/617 |
| 2011/0133527 A1 | 6/2011 | Taylor |
| 2019/0135136 A1* | 5/2019 | Akaike .................... B60N 2/32 |

FOREIGN PATENT DOCUMENTS

| | | |
|---|---|---|
| EP | 3800122 A1 | 4/2021 |
| EP | 3812275 A1 | 4/2021 |

* cited by examiner

DEVICE TO RESOLVE ANGLED OTTOMAN CONFIGURATION

BACKGROUND

Many aircraft include fully reclining seats. In aircraft with fully reclining seats and separate ottomans, there is a discontinuity between the seat and the ottoman in the reclined configuration. Seating areas must define sufficient leg room for the passenger, but existing reclining seats cannot fill the leg room space when fully reclined to fill the space between the ottoman and the fully reclined seat.

Furthermore, the space between the ottoman and the fully reclined seat is often irregularly shaped. It would be advantageous is a device existed to bridge the gap between an ottoman and seat when the seat is fully reclined.

SUMMARY

In one aspect, embodiments of the inventive concepts disclosed herein are directed to a deployable ottoman extension that fills the gap between the ottoman and fully reclined, oblique aircraft seat. The deployable ottoman extension can pivot out from the ottoman about a pivot point and/or slide out along a rail. Alternatively, the ottoman extension may be hinged to the ottoman to deploy by flipping down.

In a further aspect, the deployable ottoman extension may include deployable support features that extend to the aircraft floor when deployed.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
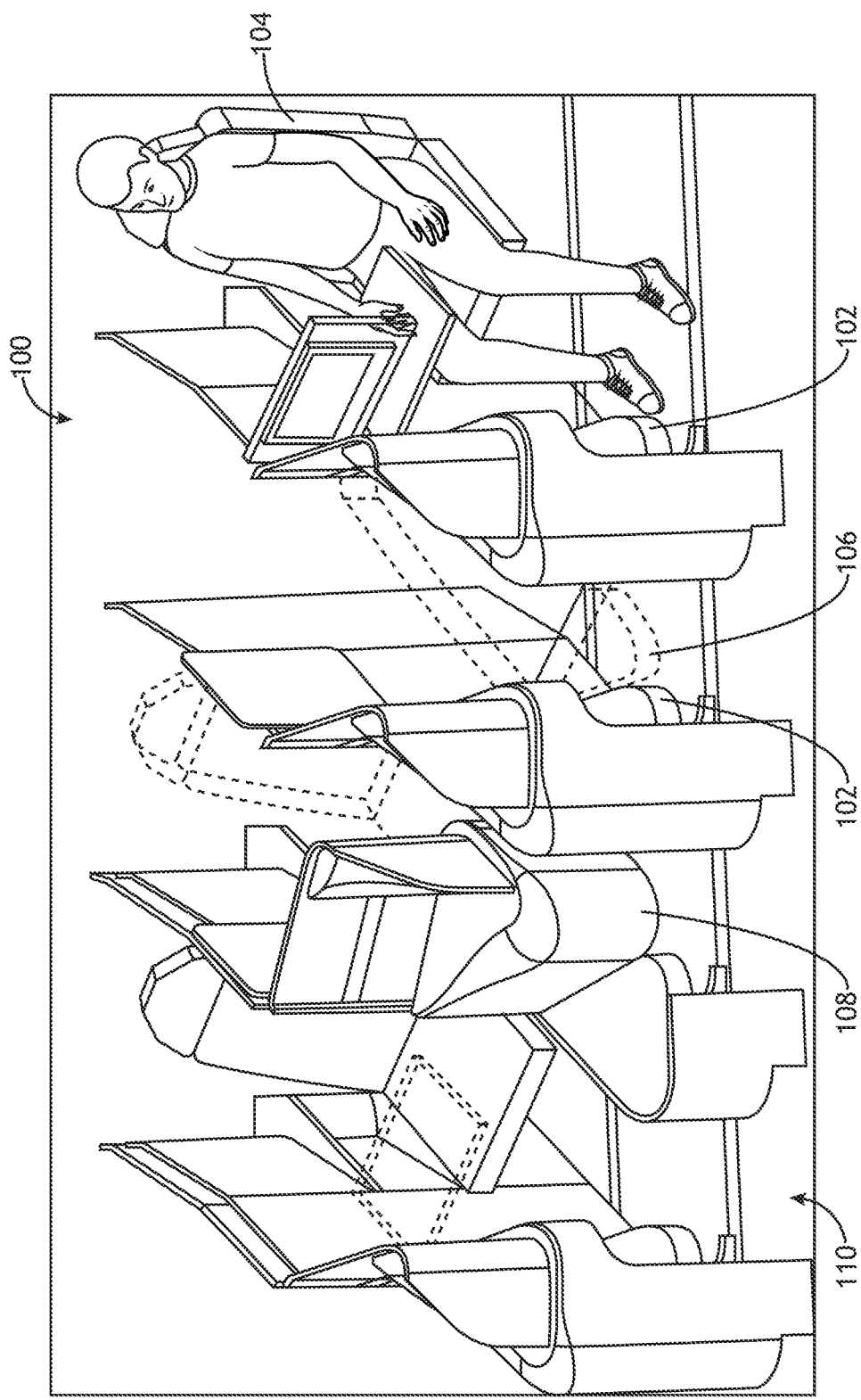
FIG. 1 shows a perspective, environmental view of oblique aircraft seats according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a deployable ottoman extension that fills the gap between the ottoman and fully reclined oblique aircraft seat. The deployable ottoman extension can pivot out from the ottoman about a pivot point and/or slide out along a rail. Alternatively, the ottoman extension may be hinged to the ottoman to deploy by flipping down.

Referring to FIG. 1, a perspective, environmental view of oblique aircraft seats 100 according to an exemplary embodiment is shown. One or more of the oblique aircraft seats 100 comprises an ottoman 102 and a fully reclining seat 104. When the fully reclining seat 104 is in a reclined orientation, a deployable ottoman extension 106 may be deployed to fill the space between the ottoman 102 and a proximal surface of the fully reclining seat 104.

In at least one embodiment, one or more of the oblique aircraft seats 100 may be adapted for ease of access. For example, some surrounding elements 108 may be configured to move so as to provide an enhanced access way 110. In at least one embodiment, the enhanced access way 110 may include access to a neighboring ottoman 102 to facilitate entry to the oblique aircraft seats 100 adapted for ease of access. In such embodiments, the deployable ottoman extension 106 corresponding to that ottoman 102 may be disposed so as to not interfere with the movement of the surrounding elements 108.

Figure 2:
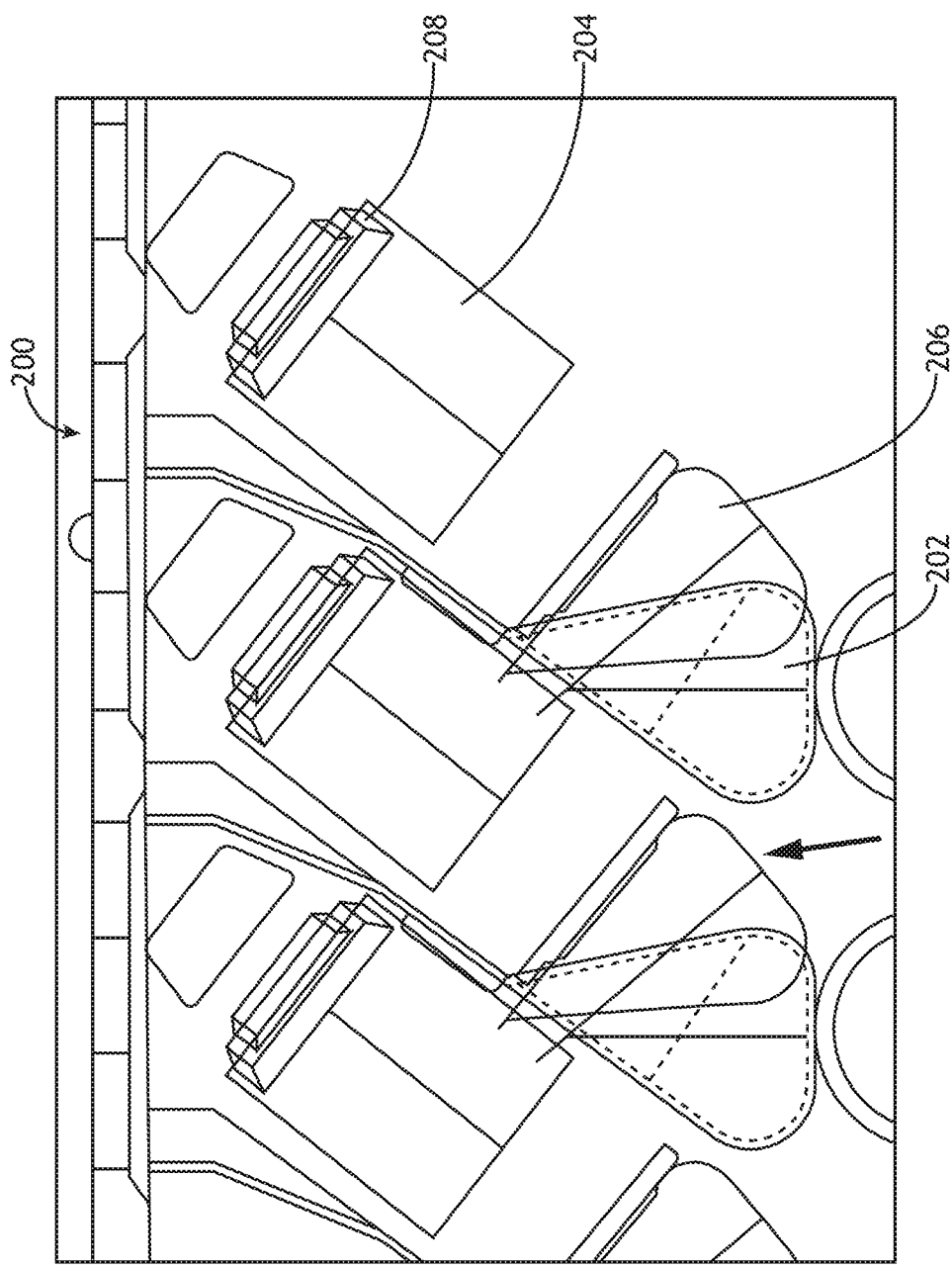
FIG. 2 shows a top, environmental view of oblique aircraft seats according to an exemplary embodiment.

Referring to FIG. 2, a top, environmental view of oblique aircraft seats 200 according to an exemplary embodiment is shown. Each oblique aircraft seat 200 comprises an ottoman 202, and a fully reclining seat comprising a seat portion 204 and a backrest portion 208. The seat portion 204 and the backrest portion 208 define mechanical linkages that allow the seat portion 204 and the backrest portion 208 to transition to a flat configuration where the seat portion 204 and the backrest portion 208 define a bed. In the flat configuration, the seat portion 204 does not extend all the way to the ottoman 202. The deployable ottoman extension 206 is deployed from the ottoman 202 to at least partially fill the gap. In at least one embodiment, the gap is irregular due to the oblique nature of the aircraft seat 200; that is to say, there is a substantial angle between proximal surfaces of the seat portion 204 and the ottoman 202.

Figure 3:
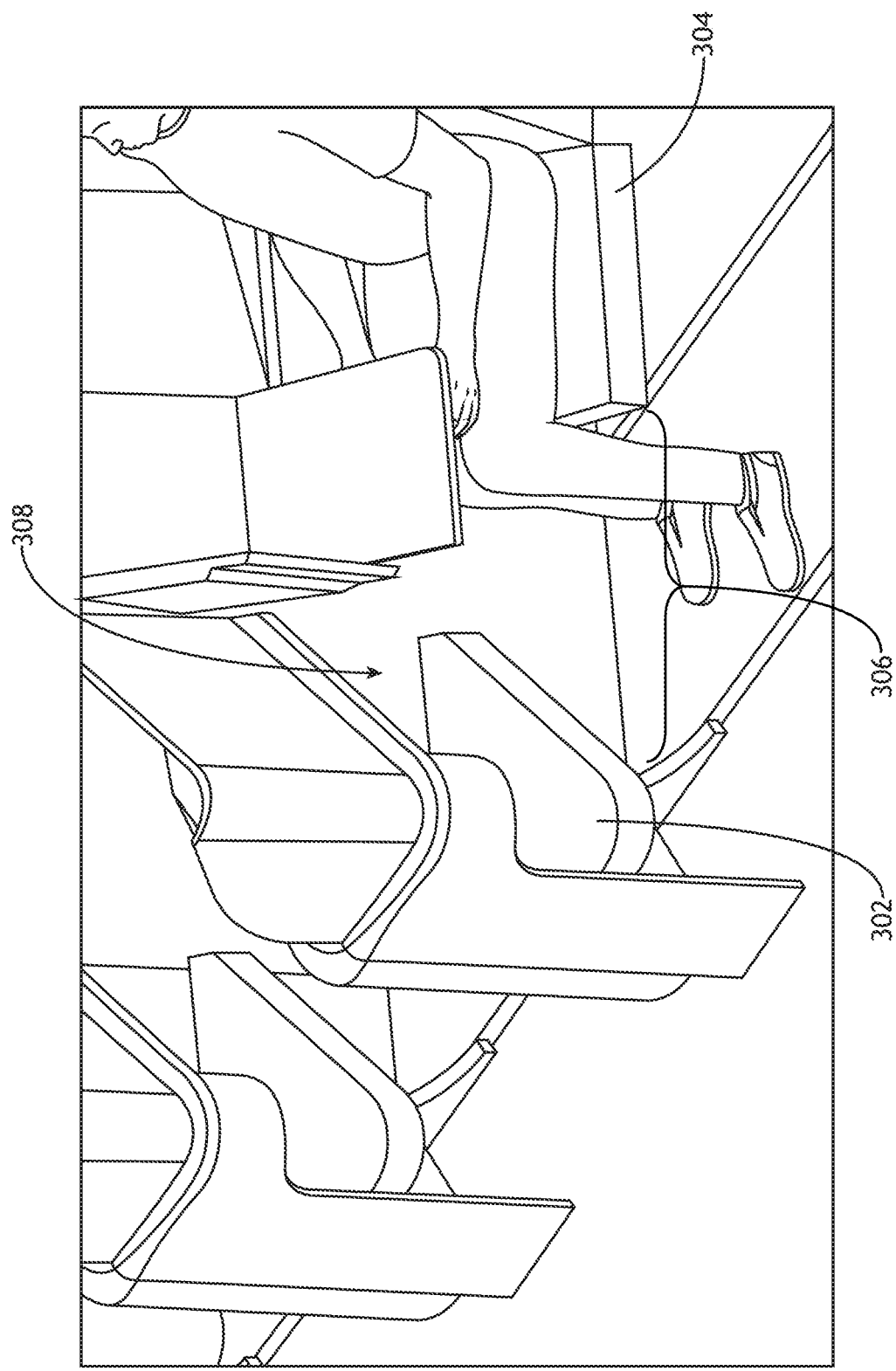
FIG. 3 shows a perspective, environmental view of oblique aircraft seats according to an exemplary embodiment.

Referring to FIG. 3, a perspective, environmental view of oblique aircraft seats according to an exemplary embodiment is shown. Each oblique aircraft seat comprises an ottoman 302 and a seat portion 304. In order to facilitate movement in and out, and to provide sufficient leg room for the passenger, the ottoman 302 and seat portion 304 define a separation 306. Furthermore, the ottoman 302 and surrounding enclosure define a space 308 for the passenger's feet. In order to provide a sufficient separation 306, and sufficient contact surface of the ottoman 302 for the passenger's feet, the shape of the ottoman 302 does not correspond to the shape of the seat element 304. A deployable ottoman extension may extend the superior surface of the ottoman 302 to facilitate use by the passenger while still allowing the deployable ottoman extension to be stowed when for leg room is desired.

Figure 4:
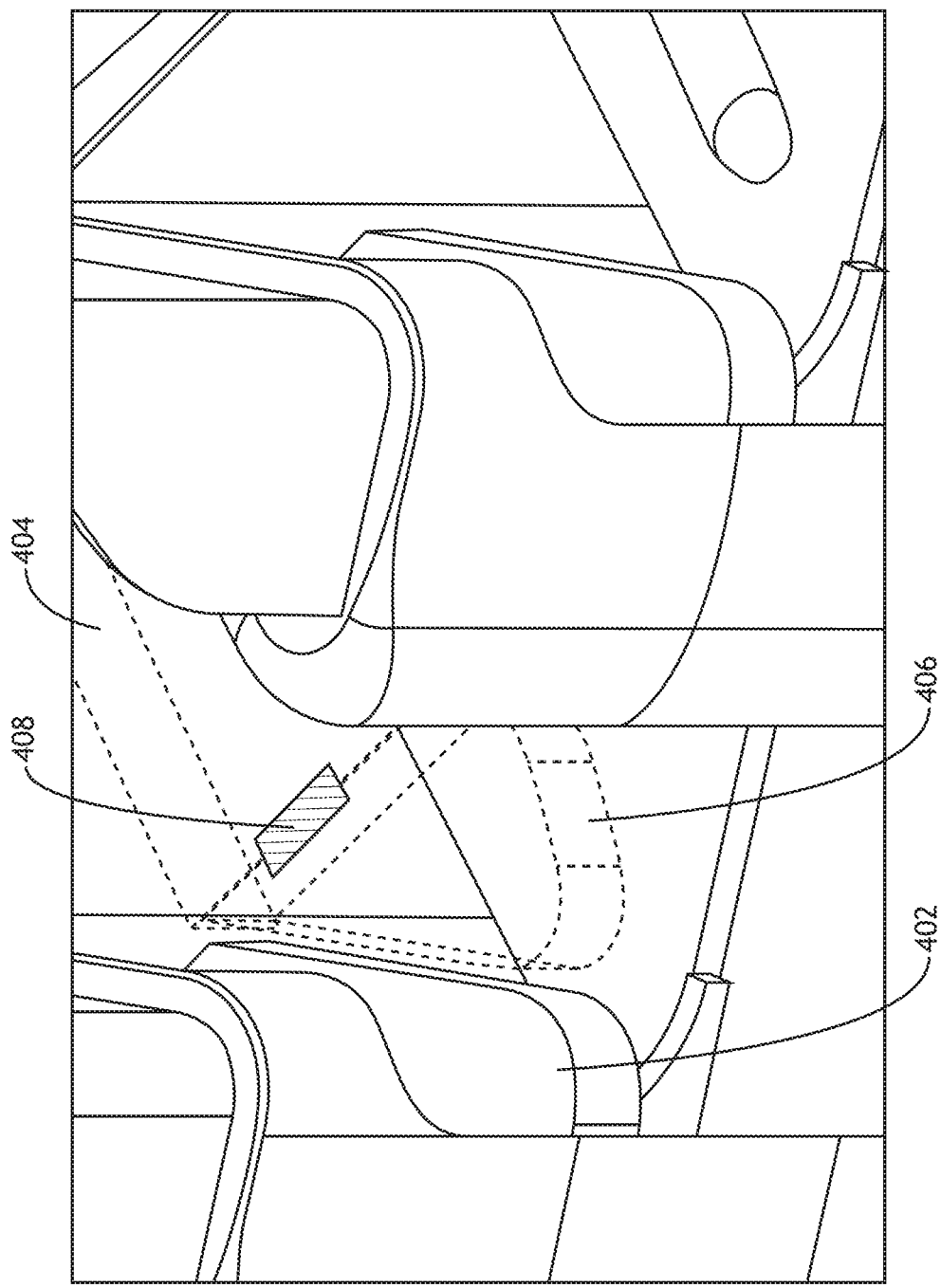
FIG. 4 shows a perspective, environmental view of an exemplary embodiment.

Referring to FIG. 4, a perspective, environmental view of an exemplary embodiment is shown. An ottoman 402 in an oblique aircraft seat includes a deployable ottoman extension 408 configured to deploy from the ottoman 402 and engage a seat portion 404 of the oblique aircraft seat when the seat is fully reclined. The deployable ottoman extension 406 is shaped to substantially fill a gap defined by the ottoman 402 and the seat portion 404 when fully reclined.

In at least one embodiment, the deployable ottoman extension may define an attachment element 408 configured to releasably attach the deployable ottoman extension 406 to the seat portion 404. For example, the attachment element 408 may comprise a fabric element with some portion of hook and loop fabric to engage a corresponding hook and loop fabric element on the seat portion 404.

Figure 5:
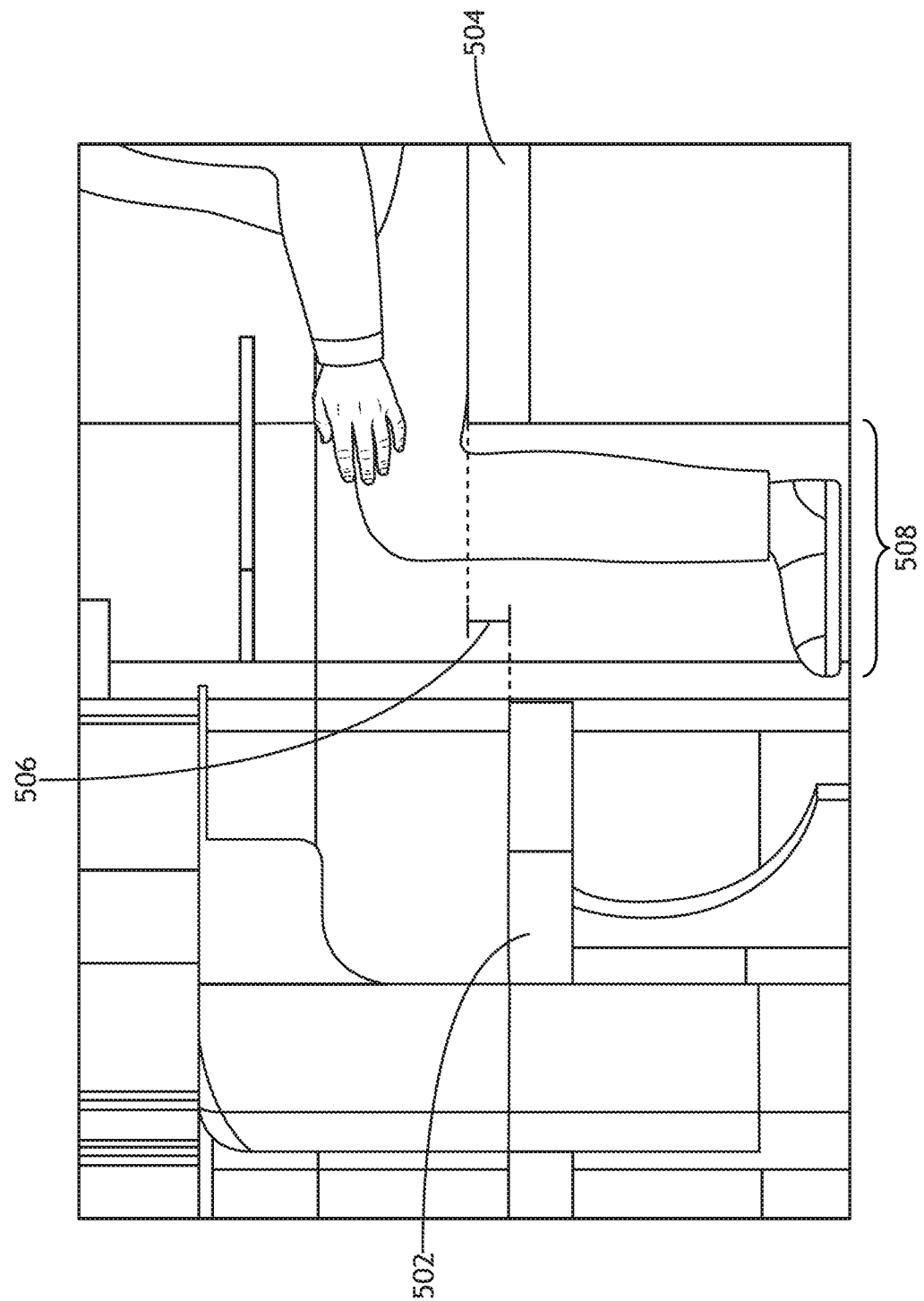
FIG. 5 shows a side, environmental view of an oblique aircraft seat according to an exemplary embodiment.

Referring to FIG. 5, a side, environmental view of an oblique aircraft seat according to an exemplary embodiment is shown. Where the oblique aircraft seat comprises an ottoman 502 and a seat portion 504, the seat portion 504 may have a horizontal separation 508 from the ottoman 502 to provide sufficient lag room for the passenger, and vertical separation 506 to facilitate comfortable use of the ottoman 502. When fully reclined, the seat portion 504 may transition to a lower orientation to cover the vertical separation 506 and bring the seat portion 504 and the ottoman 502 substantially into alignment.

Figure 6:
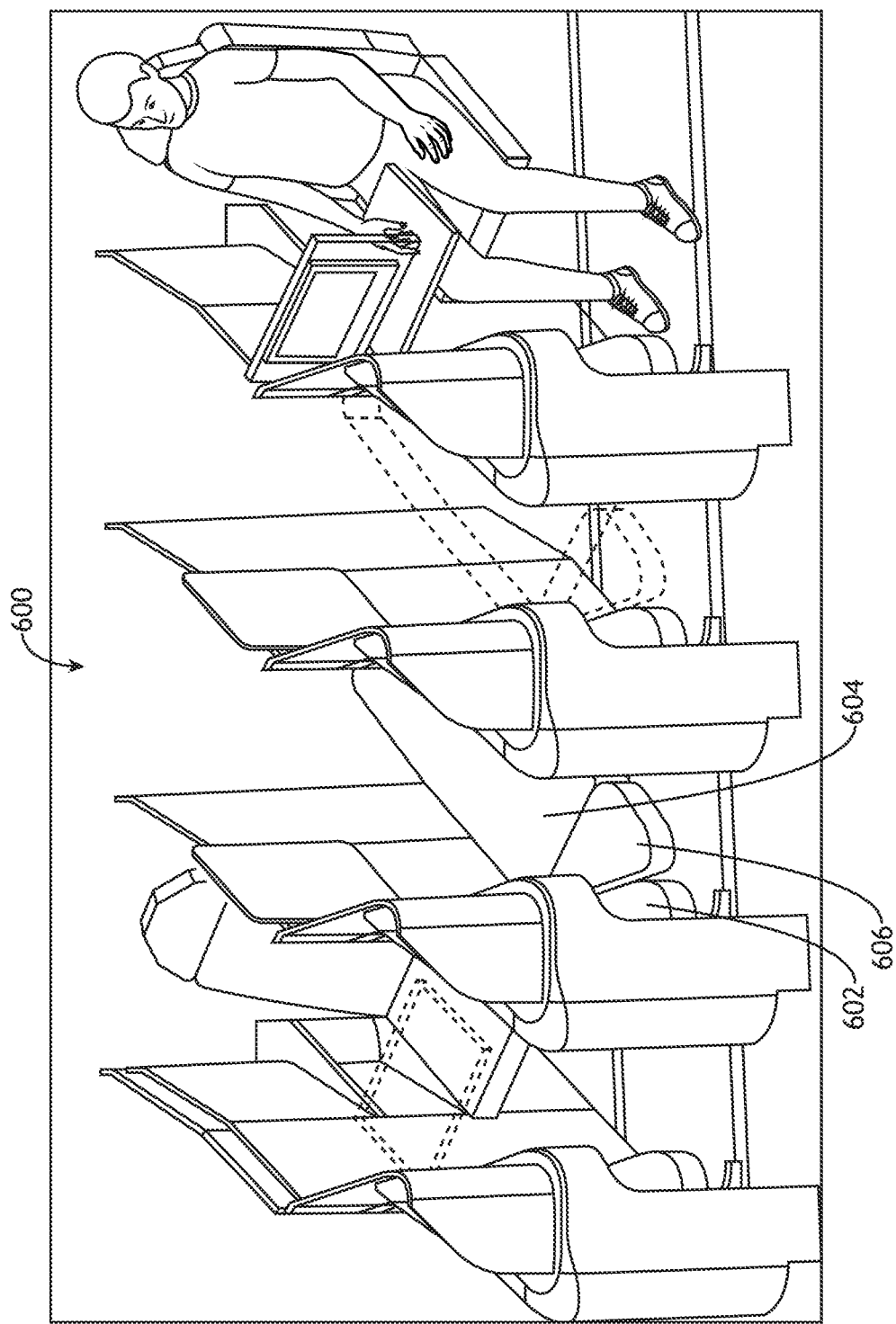
FIG. 6 shows a perspective, environmental view of a fully reclined oblique aircraft seat according to an exemplary embodiment.

Referring to FIG. 6, a perspective, environmental view of a fully reclined oblique aircraft seat 600 according to an exemplary embodiment is shown. When in a fully reclined orientation, an ottoman 602, a deployable ottoman extension 606, and a seat portion 604 define a substantially continuous, flat surface so that the passenger may lay flat.

Figure 7:
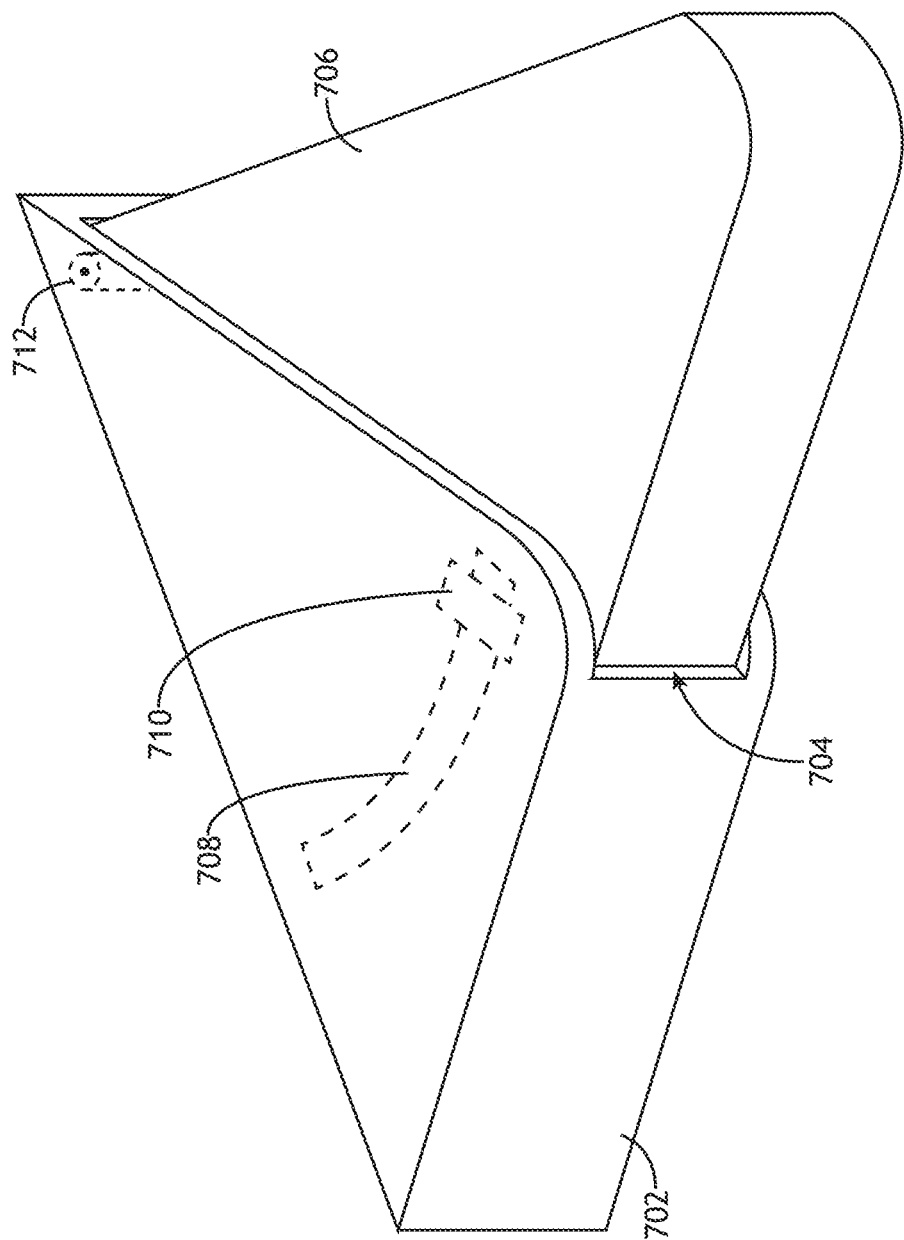
FIG. 7 shows a detail, perspective view of an exemplary embodiment.

Referring to FIG. 7, a detail, perspective view of an exemplary embodiment is shown. An ottoman 702 defines a cavity 704 to deployable receive a deployable ottoman extension 706. The deployable ottoman extension 706 may pivotably deploy about a pivot element 712. Alternatively, or in addition, the cavity 704 may comprise one or more deployment rails 708 configured to define a range-of-motion of the deployable ottoman extension 706. Each of the one or more deployment rails 708 corresponds to a guide element 710 disposed on the deployable ottoman extension 706 to allow for full extension while still limiting the maximum movement of the deployable ottoman extension 706.

Figure 8:
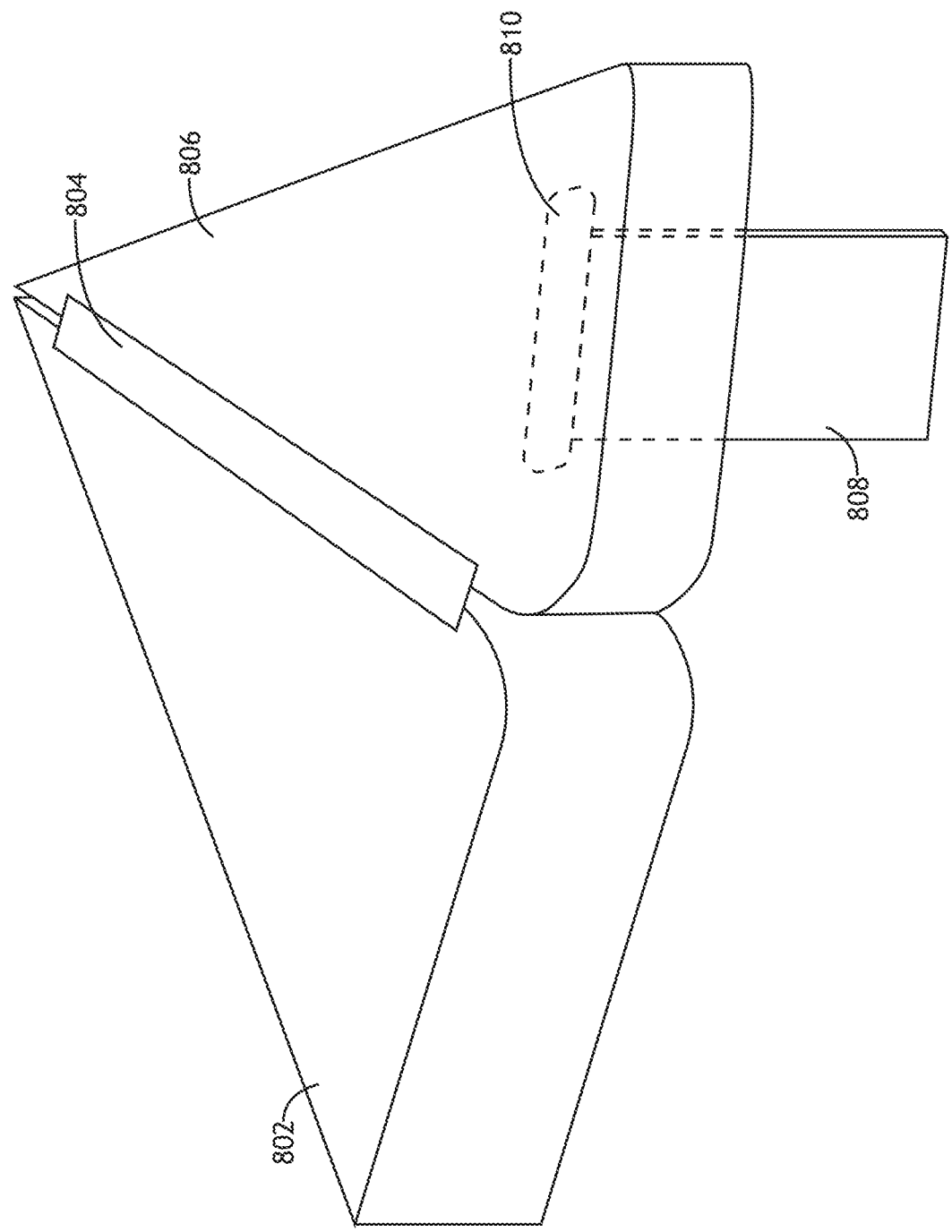
FIG. 8 shows a detail, perspective view of an exemplary embodiment.

Referring to FIG. 8, a detail, perspective view of an exemplary embodiment is shown. An ottoman 802 is attached to a deployable ottoman extension 806 via a hinge element 804 connecting a superior surface of the ottoman 802 to a superior surface of the deployable ottoman extension 806. The deployable ottoman extension 806 may be flipped down to extend the superior surface of the ottoman 802.

In at least one embodiment, the deployable ottoman extension 806 may comprise a support element 808, which may be pivotably connect to an inferior surface of the deployable ottoman extension 806 via a pivot element 810. The pivot element 801 may be lockable.

Figure 9:
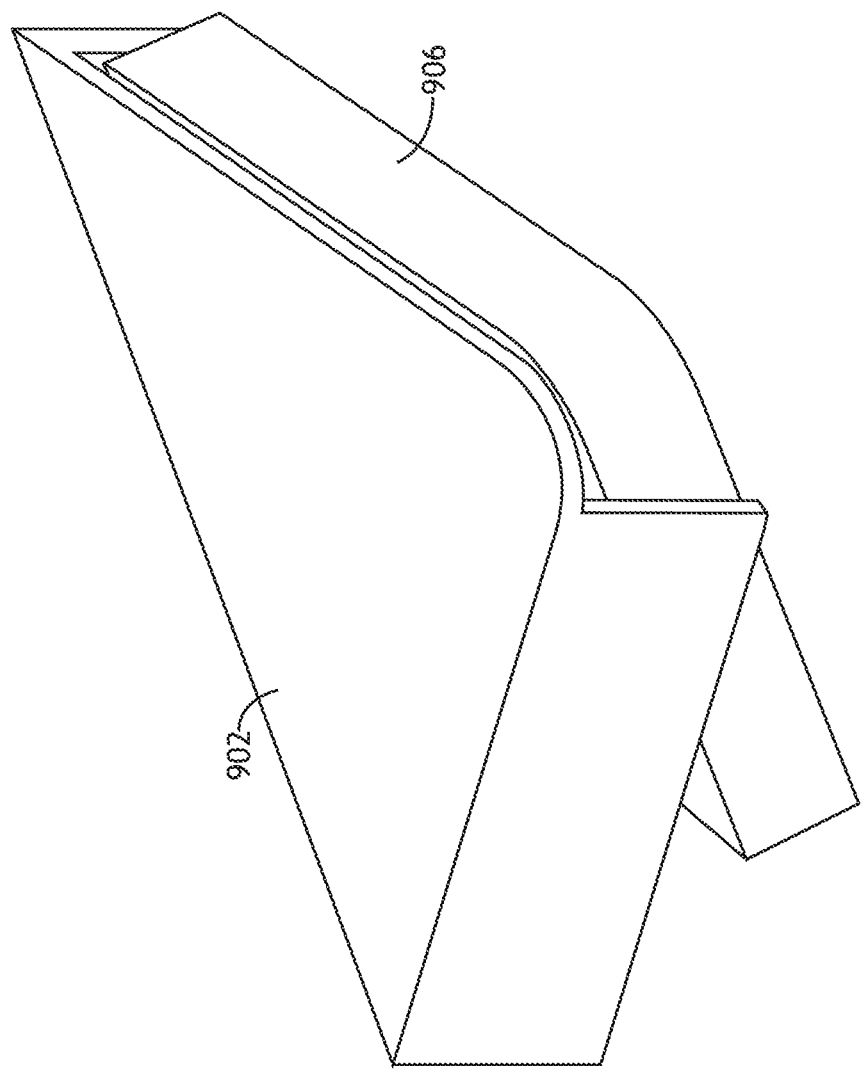
FIG. 9 shows a detail, perspective view of an exemplary embodiment.

Referring to FIG. 9, a detail, perspective view of an exemplary embodiment is shown. An ottoman 902 is attached to a deployable ottoman extension 906 configured to rotate about a hinge element connecting the ottoman 902 to the deployable ottoman extension 906. The deployable ottoman extension 906 may be flipped up to extend the superior surface of the ottoman 902.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An aircraft seat system comprising:
   an ottoman defining a cavity configured to receive a deployable ottoman extension;
   a fully reclining seat, separate from the ottoman; and
   a deployable ottoman extension, separate from the fully reclining seat, configured to deploy from the cavity,
   wherein the deployable ottoman extension is configured to pivotably deploy and at least partially occupy a gap defined by a surface of the fully reclining seat when the fully reclining seat is reclined and the ottoman.

2. The aircraft seat system of claim 1, further comprising:
an extension rail disposed on an internal surface of the ottoman; and
an extension guide disposed on a surface of the deployable ottoman extension,
wherein the extension guide is configured to engage and slide along the extension rail during deployment and define a maximum deployment of the deployable ottoman extension.

3. The aircraft seat system of claim 1, further comprising a stowable support element pivotably mounted on a surface of the deployable ottoman extension.

4. The aircraft seat system of claim 1, wherein:
the deployable ottoman extension comprises an attachment element configured to releasably affix the deployable ottoman extension to the fully reclining seat when deployed.

5. An aircraft ottoman comprising:
a deployable ottoman extension configured to pivotably deploy and at least partially occupy a gap defined by a surface of a fully reclining seat when the fully reclining seat is reclined and the aircraft ottoman, wherein:
the aircraft ottoman defines a cavity configured to receive the deployable ottoman extension; and
the aircraft ottoman and deployable ottoman extension are separate from the fully reclining seat.

6. The aircraft ottoman of claim 5, further comprising:
an extension rail disposed on an internal surface of the ottoman; and
an extension guide disposed on a surface of the deployable ottoman extension,
wherein the extension guide is configured to engage and slide along the extension rail during deployment and define a maximum deployment of the deployable ottoman extension.

7. The aircraft ottoman of claim 5, further comprising a stowable support element pivotably mounted on a surface of the deployable ottoman extension.

8. The aircraft ottoman of claim 5, wherein:
the deployable ottoman extension comprises an attachment element configured to releasably affix the deployable ottoman extension to the fully reclining seat when deployed.

\* \* \* \* \*